United States Patent [19]
Wolf et al.

[11] Patent Number: 5,312,854
[45] Date of Patent: May 17, 1994

[54] COLOR-STABILIZING POLYARYLENE SULFIDE MIXTURE

[75] Inventors: Udo Wolf; Burkhard Köhler, both of Krefeld; Alfred Zembrod, Bergisch Gladbach; Klaus Kraft, Krefeld; Helmut Görner, Muelheim, all of Fed. Rep. of Germany

[73] Assignee: Bayer Aktiengesellschaft, Leverkusen, Fed. Rep. of Germany

[21] Appl. No.: 84,315

[22] Filed: Jun. 25, 1993

Related U.S. Application Data

[63] Continuation of Ser. No. 864,617, Apr. 7, 1992, abandoned.

[30] Foreign Application Priority Data

Apr. 19, 1991 [DE] Fed. Rep. of Germany ........ 4112788

[51] Int. Cl.$^5$ ............................................. C08K 5/09
[52] U.S. Cl. .................... 524/270; 524/609; 524/285; 525/537
[58] Field of Search .............. 524/285, 609, 270; 525/537

[56] References Cited

U.S. PATENT DOCUMENTS 4,863,981 9/1989 Gugumus .......................... 524/102

FOREIGN PATENT DOCUMENTS 0140370 4/1985 European Pat. Off. .
0193951 3/1986 European Pat. Off. .
WOA8202396 1/1982 PCT Int'l Appl. .

OTHER PUBLICATIONS

World Patents Index Latest, AN 92-093982 & JPA 4 039 387, 1992.
World Patents Index Latest, AN 83-804376 & JPA 58 160 343, 1983.

*Primary Examiner*—John C. Bleutge
*Assistant Examiner*—Mark D. Sweet
*Attorney, Agent, or Firm*—Connolly & Hutz

[57] ABSTRACT

The invention relates to a mixture of PPS and colophony which shows improved color stability during processing at high temperatures.

4 Claims, 2 Drawing Sheets

COLOR-STABILIZING POLYARYLENE SULFIDE MIXTURE

This is a continuation of U.S. application Ser. No. 07/864,617, filed 07 Apr. 1992, now abandoned.

This invention relates to a mixture containing polyarylene sulfide, preferably polyphenylene sulfide, having a color-stabilizing effect.

Immediately after its production, polyphenylene sulfide (PPS) is a colorless substance. On heating in air, PPS turns brown in color. This effect occurs in particular during the processing of PPS in machines where the material being processed undergoes an increase in temperature. Machines of this type include, for example, the granulating screws used to convert PPS into a commercial form.

Accordingly, the problem addressed by the present invention was to protect polyarylene sulfides against unwanted discoloration.

This problem has been solved by mixing polyarylene sulfide with colophony, a resin.

The process according to the invention is particularly suitable for the production of color-stabilized polyphenylene sulfide in linear or branched form as known, for example, from U.S. Pat. No. 3,354,129 or EP-A-171 021. Colophony essentially contains resinic acids, more particularly abietic acid and its isomers, and its derivates. These acids belong to the tricyclic $C_{20}$ acids.

Disregarding other fillers or reinforcing materials, the mixture preferably consists of 80 to 99.98% and, more preferably, of 90 to 99.8% polyarylene sulfide, preferably polyphenylene sulfide, and 0.02 to 20% and, more preferably, 0.2 to 10% acids corresponding to the formula

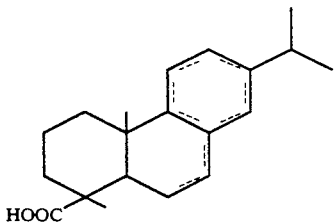

at least one conjugated double bond system being present in the region marked by chain lines, or esters, salts or amides thereof.

The quantities mentioned are independent of other fillers or reinforcing materials. These may be added in quantities of 0 to 300 parts by weight to 100 parts by weight of the above-described mixture. To obtain a colorstabilized PPS, the above-mentioned resinic acids or mixtures thereof are preferably added after the actual production reaction. More particularly, they are added during press-molding or compaction of the polyphenylene sulfide immediately before the actual granulation step.

The invention is illustrated in the following by an example and comparison example in conjunction with the accompanying drawings, wherein.

Figure 1:
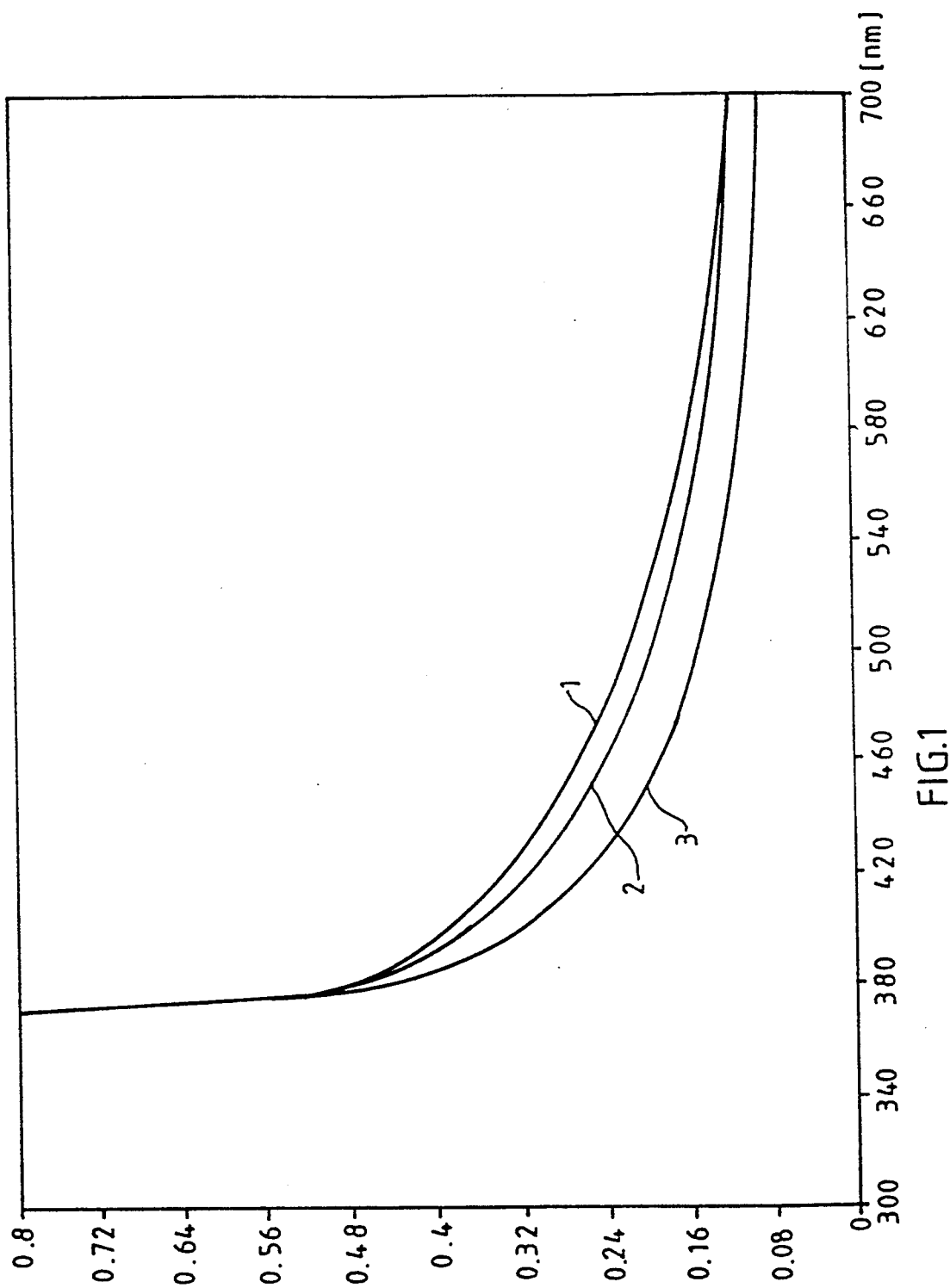
FIG. 1 shows the UV/VIS absorption spectrum of PPS mixed with colophony.
Figure 2:
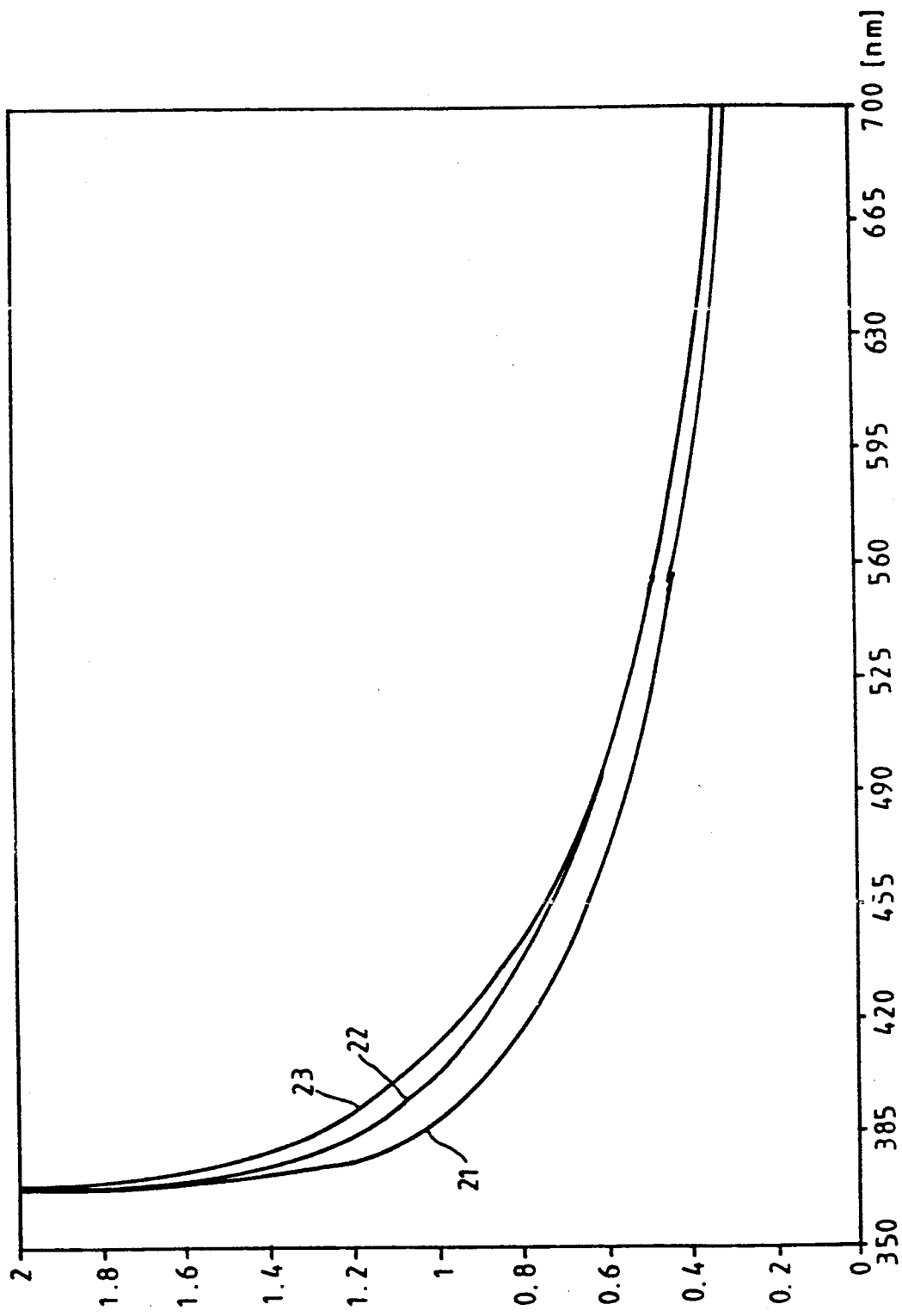
FIG. 2 shows the UV/VIS absorption spectrum of PPS mixed with Irganox ® (comparison example).

The substances to be mixed in are incorporated in a predetermined quantity of PPS using a kneading machine. To record the absorption spectra at wavelengths in the range from 350 to 700 nm, colophony was incorporated in concentrations of 0% (spectrum 1), 0.5% (spectrum 2) and 2% (spectrum 3), based on the weight of the PPS, over a period of 5 mins. at a temperature of 285° C. For comparison, 0% (spectrum 21), 0.5% (spectrum 22) and 2% (spectrum 23) of a commercially available antioxidant (Irganox ®) based on dibutylhydroxyphenyl propionic acid ester were identically mixed with PPS. For the spectroscopic measurements, approx. 100 μm thick transparent films were produced from all the materials over a period of 3 mins. at a mold temperature of 280° C.

Whereas the addition of Irganox ® leads to an increase in absorption which is visually discernible as browning, the PPS mixture with colophony shows lower absorption of the product after processing. This leads to a significantly lighter product.

We claim:

1. A mixture consisting essentially of
   a) 80 to 99.98% polyarylene sulfide and
   b) 0.02 to 20% of an acid or a mixture of acids having the following basic structure

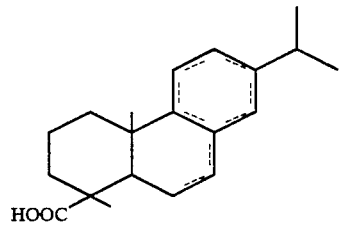

with at least one conjugated double bond system being present in the region marked by chain lines, or esters, salts or amides thereof.

2. A mixture as claimed in claim 1 consisting of 100 parts by weight of the mixture of a) and b) and 0 to 300 parts by weight of fillers or reinforcing materials.

3. The mixture of claim 1, wherein the polyarylene sulfide is polyphenylene sulfide.

4. The mixture of claim 1, wherein said polyarylene sulfide a) is present in a quantity of 90.00 to 99.98% of the mixture, and said acid b) is present in a quantity of 0.02 to 10.0% of the mixture.

* * * * *